Patented Jan. 12, 1954

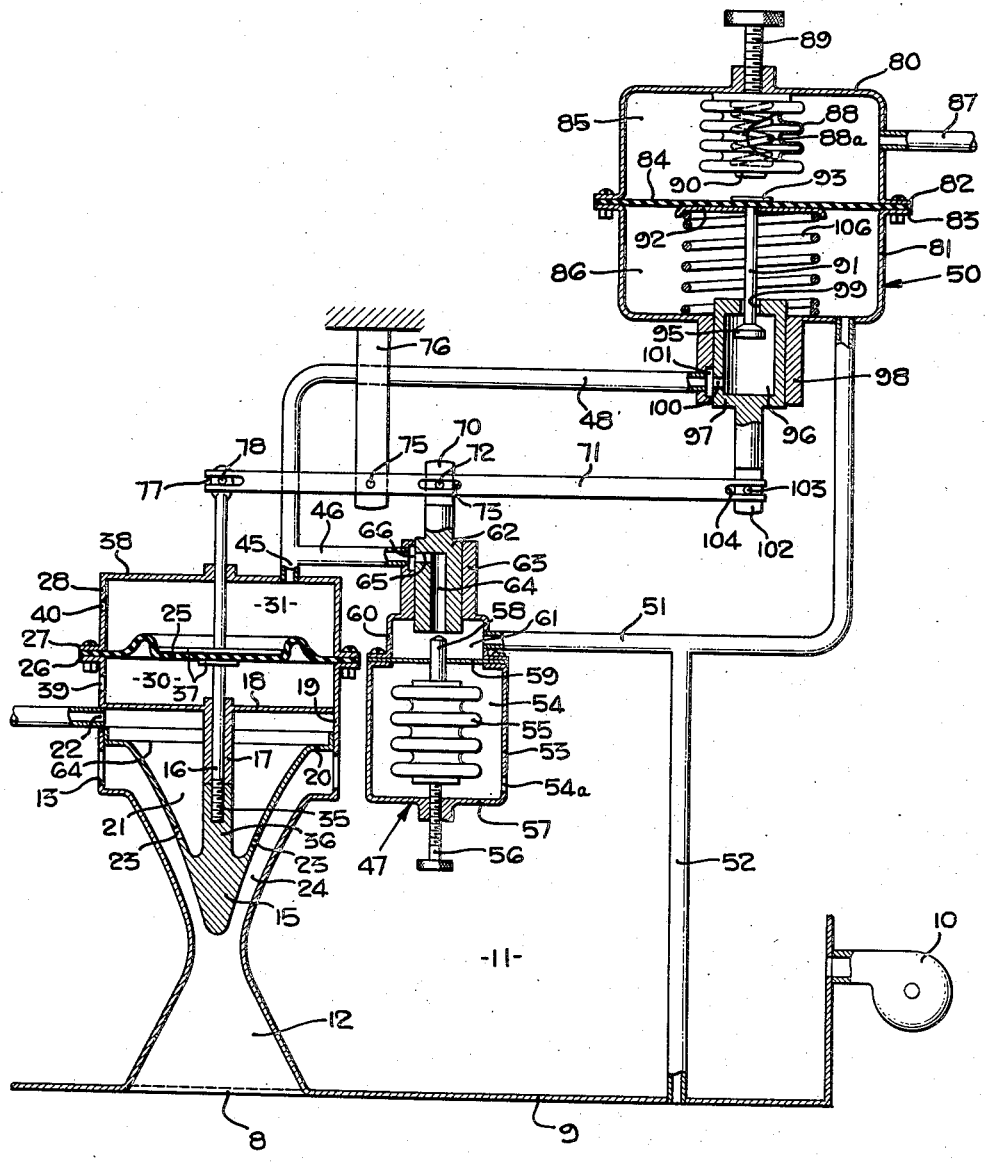

2,665,624

UNITED STATES PATENT OFFICE 2,665,624

DIFFERENTIAL AND RATIO CONTROL

Robert A. Arthur, Los Angeles, Calif., assignor to The Garrett Corporation, Los Angeles, Calif., a corporation of California Application June 17, 1950, Serial No. 168,726

5 Claims. (Cl. 98—1.5)

This invention relates to pressure control means, and relates more particularly to a differential and ratio control mechanism for controlling the pressure within an enclosure.

It is to be understood that the present invention is useful in controlling or regulating fluid pressure in various types of installations, but as said invention has particular utility in controlling the pressure in enclosures, such as aircraft cabins, said invention is illustrated and described, by way of example, in connection with one type of enclosure pressure regulator.

A commonly used cabin pressurization system is one in which cabin pressure is permitted to remain substantially the same as atmospheric pressure until a predetermined altitude has been reached, to maintain a substantially constant cabin pressure between that altitude and a second predetermined and higher altitude, and, above such second predetermined altitude, to maintain a substantially fixed differential relative to external atmosphere. In the isobaric range of operation of such a system, wherein cabin pressure is maintained constant, there will be a fairly rapid increase in the ratio between cabin pressure and atmospheric pressure; in the differential range of operation, wherein a fixed differential between cabin pressure and ambient pressure is maintained, the ratio between cabin and ambient pressure will continue to increase as the aircraft continues to gain altitude. It is desirable to limit this increase in ratio in order to avoid an unfavorable effect upon supercharger operations which become manifest at the higher ratios, since superchargers are ratio devices, and a surging of the airflow would result if the ratio of cabin pressure to atmospheric pressure were to exceed the ratio capacity of the supercharger.

It is particularly desirable to limit the ratio in military aircraft, in order to avoid the injurious effect on the human body of explosive decompression which results from a sudden release of pressure from within a cabin which has been badly ruptured in combat. In explosive decompression, assuming a perforation or rupture of a given maximum size in the cabin wall, the volume of the cabin determines the maximum safe ratio between the pressures of air in the human body before and after explosive decompression. The pressure of air in the human body before explosive decompression equals cabin pressure minus the partial pressure of water vapor in the human body at body temperature, which equals 1.85 inches of mercury. The pressure of air in the human body after explosive decompression equals atmospheric pressure minus said partial pressure of water vapor in the human body at body temperature. If the said maximum safe ratio between the pressures of air in the human body before and after explosive decompression is not to be exceeded, then at high altitudes the ratio between cabin and ambient atmospheric pressures must decrease as the aircraft ascends.

With the foregoing problems in mind, the invention provides, in a pressure regulating system, a differential and ratio control arrangement which is adapted to permit the ratio between cabin and ambient pressures to gradually increase up to a predetermined limit and to prevent the ratio exceeding that limit. More specifically, and in connection with the use of the invention in military aircraft, the invention aims to provide a pressure regulating system adapted to permit the ratio to gradually increase up to a predetermined limit and to then cause the ratio to gradually decrease as the plane attains higher altitude.

For a puncture of a given area, the rate of decompression in a small plane such as a fighter will be much more rapid than the rate of decompression of a large airplane such as a long range bomber. Because the decompression rate is slower, it is not necessary to restrict the ratio to as low a figure in a large airplane as in a small one.

The decrease in pressure above the altitude at which the maximum safe ratio is reached for military operations should be brought about in a manner which will maintain a substantially constant ratio between cabin and ambient pressure values, each diminished by a constant. The most desirable ratio is one in which the value of its constant is 1.85 (the vapor pressure in inches of mercury within the human lung at body temperature). The greatest protection at maximum safe pressure against the injurious effect of explosive decompression can be attained where a constant ratio is maintained between (C—1.85) and (A—1.85) where C represents cabin pressure and A represents ambient pressure in inches of mercury. Accordingly, another object of the invention is to provide an arrangement for maintaining a substantially constant ratio between cabin pressure minus 1.85 and ambient pressure minus 1.85, or between cabin and ambient atmospheric pressures, each diminished by any selected constant, which may be zero.

A further object of the invention is to provide a differential pressure control and a ratio control in a single unit employing common mechanism for both control functions.

Another object of the invention is to provide mechanism of this character, wherein the ratio control is adapted to override a previously operative control such as a differential pressure control mechanism.

A further object of the invention is to provide a differential and ratio control unit wherein hunting is minimized or substantially eliminated.

A still further object of the invention is to provide a device of this character that is of extremely simple and inexpensive construction and operation.

Further objects and advantages of the invention will be brought out in the following part of the specification.

Referring to the drawing, which is for illustrative purposes only, there is shown a schematic sectional view of a pressure regulator embodying the invention.

As an example of a system embodying the invention, there is shown in the drawing a regulator adapted to control the outflow through an outlet 8 in the wall 9 of an aircraft cabin, of air which is pumped into the cabin under pressure by suitable supercharging apparatus 10 or by a ram. The regulator is adapted to be disposed within the cabin 11 and embodies an outlet passage 12 of generally Venturi shape, connected adjacent its upper end with the cabin by way of openings 13 in the wall of the regulator casing. A valve 15 controls the outlet 12 and has a stem 16 slidably received in a guide 17 depending from a partition wall 18 of the casing, and which defines the upper end, as shown in the drawing, of a cylindrical portion 19 of the casing, and which serve as a cylinder for a piston-like portion 20 of the valve 15, the cylindrical portion 19 and valve 15 defining a chamber 21. The chamber is in communication with a source of air under relatively high pressure, such as the cabin, by way of an aperture 22. The size of said aperture may be regulated by an adjustable needle valve or the like, not shown. Air flows out of the chamber 21 through ports 23, communicating through the valve wall with the Venturi throat 24 formed between the valve 15 and the outflow passage 12.

Means for actuating the valve 15 is provided and comprises pressure responsive means shown as a flexible diaphragm 25, marginally secured between a flange 26 of the lower portion of the regulator casing and a flange 27 of an upper casing member 28, so that the lower and upper sides of the diaphragm 25, as shown in the drawing, are subjected to the pressures of the respective chambers 30 and 31, the chamber 30 being partly defined by the lower casing wall 18.

As shown, the lower end of the stem 16 is threaded at 35 and is threadably received in a threaded bore provided therefor in an internal boss 36 of the valve 15 and movement of the valve 15 being limited in the opening direction by engagement of the adjacent ends of the boss 36 and guide 17.

The stem 16 extends through an opening in the diaphragm 25 and is connected to said diaphragm by suitable means shown as comprising washers 37 suitably attached to the stem and between which a central area of said diaphragm is clamped. The upper end portion of the stem 16 extends upwardly through an opening provided therefor in the upper end wall 38 of the upper casing member 28, and is slidable in said opening.

The chamber 30 is connected to a source of higher pressure such as the cabin, by a passage 39, so that cabin pressure prevails therein. Chamber 31, which comprises a control pressure chamber, has a bleed connection 40 with a source of higher pressure, such as the cabin, said bleed connection being restricted and suitably calibrated. The chamber 31 also has outlet means for connecting said chamber with a region of lower pressure, such as ambient atmosphere, and said outlet means includes a conduit 45 having a branch 46 leading to an absolute pressure responsive control device, indicated generally at 47, and a branch 48 leading to a differential and ratio control device, indicated generally at 50. Both the absolute pressure responsive device 47 and the differential and ratio control device 50 are connected to atmosphere by means of conduits 51 and 52.

The absolute pressure responsive control device comprises a housing or casing 53 defining a chamber 54, connected with the cabin through openings 54a, so that cabin pressure will prevail in the chamber 54. Within the chamber 54 is disposed a sealed, evacuated bellows 55 having one end secured to an adjusting screw 56, threadably received in an opening provided therefor in the bottom wall 57, as shown in the drawing, of the housing 53. The opposite end of the bellows 55 is movable and carries a valve member 58, which slidably extends through an opening in a plate 59 defining the upper end of the chamber 54. A cap 60 is suitably attached to the housing 55 and includes a chamber 61, with which the conduit 51 is connected. The chamber 61 is also connected with the conduit 46 through a movable valve member 62 which is slidable in a guide 63, shown as being integral with the cap 60. The valve member 62 has a longitudinal bore 64 and a lateral bore 65 communicating with an elongated recess 66, with which the conduit 46 is connected. Thus, the conduit 46 will freely communicate with the lateral bore 65 as the valve member 62 slides in its guide 63 throughout the range of movement of said valve member 62.

The valve member 62 has an extension 70 which is slotted for reception of a lever 71 to which said valve member 62 is connected by means of a pin 72 which passes through a slot 73 in the lever 71 to permit free operative movements of the respective parts. The lever 71 is pivotally connected at 75 to a fixed support 76, the pivot 75 being positioned between the point whereat the valve member 72 is connected to the lever 71 and a slotted end 77 of the lever 71. The slot 77 receives a pin 78 secured in the upper end portion of the valve stem 16, so that movements of said valve stem are transmitted to the valve member 62. When the valve 15 moves in the opening direction the valve member 62 moves in a direction to restrict the flow from the chamber 31 through the conduit 46 and vice versa.

The differential and ratio control device is shown as comprising a pair of casing members 80 and 81, which are cup-shaped and have respective flanges 82 and 83 respectively, between which is clamped a movable wall or diaphragm 84, whereby said diaphragm separates the housing formed by the casing members 80 and 81 into chambers 85 and 86, the chamber 85 being connected with the cabin by means of a conduit 87 so that cabin pressure prevails in said chamber 85.

Within the chamber 85 is a sealed, evacuated bellows 88, having one end connected to an adjusting screw 89 threadably received in an opening provided therefor in the bottom wall of the casing member 80, there being a spring 88a urging expansion of said bellows 88, shown as disposed within said bellows. The opposite end or head 90 of the bellows 88 is movable. A movable valve member 91 is suitably connected to the diaphragm 84 and, as shown, said connection is effected by means of a spring retainer 92 and a washer 93 disposed on opposite sides of said diaphragm.

The valve member 91 has a head 95 extending into a valve chamber 96 of a movable valve member 97, slidably received in an outwardly extending guide 98 of the casing member 81. The stem 91 of the valve member extends through an opening 99 of the valve member 97, said opening 99 being of larger size than the stem of valve 91 so as to provide communication between the chamber 96 and the chamber 86. The opening 99 is controlled by the head 95 of the valve. The chamber 96 also has a lateral opening 100 which communicates with the recess 101 in the wall of the guide 98, and said recess 101 is connected with the conduit 48. The recess 101 is elongated to provide communication between the conduit 48 and the chamber 96 as the valve member 97 is slidably moved in the guide 98, said valve member 97 having an extension 102 provided with a pin 103 operably received in a slot or notch 104 in the end of the lever 71 opposite the slot 77. When the valve 15 moves in the opening direction the lever 71 causes the valve member 97 to move in a direction to restrict escape of fluid from the chamber 31 through the conduit 48 and vice versa.

The chamber 86 is also connected with the conduit 51 and a spring 106 reacts between the end wall of the casing member 81 and the spring retainer 92, said spring functioning to urge the valve 95 in the closing direction.

The valve 15 controls the outflow from the cabin and tends to seat upon the adjacent walls of the Venturi throat, the outer surface of the valve 15 being subjected to the low pressure of this region. Also, when the regulator is in the vertical position, as shown in the drawing, gravity tends to seat said valve.

Actuation of the valve 15 is effected by movements of a diaphragm 25 which is responsive to variations in the differential of pressure on opposite sides thereof, and the valve 15 tends to be held in the open position due to the fact that the pressure in the chamber 21 is of a relatively low value by reason of the connections 23 between said chamber and the venturi.

The pressure in the chamber 30 is substantially the same as that in the cabin, as above pointed out, and said pressure acts upwardly on the diaphragm 25, thus tending to open the valve 15.

Control of the movements of the diaphragm 25 is effected by controlling the pressure in the chamber 31. The restricted opening 40 permits bleeding of cabin air into the chamber 31, and the escape of air is controlled by the isobaric device 47 and the differential and ratio control device 50.

In a low altitude range having a predetermined upper limit such as, for example, 8000 feet, the controls 47 and 50 are not effective, so that the cabin pressure follows substantially that of ambient atmosphere.

Between said predetermined altitude and a second higher predetermined altitude, for example, 20,000 feet, the pressure in the cabin is maintained substantially constant by the isobaric control 47, the bellows 55 of which is subjected to cabin pressure, and hence, is responsive thereto. As the aircraft rises above the first mentioned predetermined altitude, the supercharger 10 being in operation, the bellows 55 will expand and restrict the escape of air from the chamber 31, thus tending to equalize the pressure across the diaphragm 25, causing the valve 15 to move toward its seat. Closing movement of the valve 15 may tend to restrict the outflow of air more than is required with a resulting increase in cabin pressure. This in turn causes a compressing effect on the bellows 55, and hence, an increase of flow from the chamber 31 with a consequent reduction of cabin pressure.

The above described hunting action is overcome by the linkage, including the lever 71, between the valve 15 and the valve member 62. With this linkage, as the valve 15 moves in the closing direction in response to expansion of the bellows 55, the valve member 62 is moved slightly away from the metering pin or valve member 58, thus tending to reopen the passage 64 and check the downward movement of the valve 15. The opposite action occurs with upward movement of the valve 15. Hunting action of the differential and ratio control mechanism is similarly prevented by said linkage.

It is to be understood that when the pressure in chamber 31 is being controlled by the isobaric control device, the differential and ratio control mechanism 50 is inoperative as a control. However, when the second predetermined altitude has been reached, control of the escape of air from the chamber 31 is taken over by the differential and ratio control mechanism, the isobaric control becomes inoperative.

Between the second predetermined altitude and a third higher predetermined altitude, the device 50 provides a differential control for maintaining a substantially constant differential of pressure between that in the cabin and atmosphere. As has been pointed out hereinabove, the diaphragm 84 is subjected on one side to cabin pressure which prevails in the chamber 85, and due to the connection 51, 52, between the chamber 86 and atmosphere, the opposite side of the diaphragm 84 is subjected to atmospheric pressure so that the valve 95 will control the escape of air from chamber 31 in accordance with variations in the differential of pressure between that in the cabin and atmosphere, and the linkage between the valve 15 and the movable valve member 97 serves to prevent hunting in a manner similar to that described hereinabove in connection with the isobaric control.

Above the third predetermined altitude the differential and ratio control mechanism is adapted to provide a ratio control, at which time the bellows 88 has expanded to a point whereat the head 90 will engage or contact the washer 93 and provide a force acting to open the valve 95. When such contact is made, the control 50 ceases to function as a differential control and becomes a ratio control. In the ratio control range, the total force acting to move the diaphragm 84 upwardly, as shown in the drawing, is the sum of the force resulting from ambient atmosphere pressure acting against the total effective area of the diaphragm and the force exerted by the spring 106. The total force acting to move the diaphragm 84 in the opposite direction is the sum of the force resulting from the pressure in the chamber 85 acting against a partial area of the diaphragm 84 equal to the total effective area of the diaphragm 84 minus the effective area of the bellows head 90 plus the spring force exerted by the spring 88a and the bellows 88.

The said two oppositely directed total forces must balance each other. It is clearly apparent from the fact that the air pressure is exerted equally against the head 90 and an equal area of the diaphragm 84 that the pressures against these areas will balance each other.

Expressed mathematically, the force on the upper side of the diaphragm 84 is equal to $C(D-B)+S'$ where C represents the air pressure within the chamber 85 which is cabin pressure; D represents the effective area of the diaphragm 84; B represents the effective area of the head 90 of the bellows 88; and S' represents the spring force of the spring 88a and bellows 88. This total force is balanced against the force on the lower side of the diaphragm 84, which may be mathematically expressed as $AD+S$, where A represents the pressure of ambient atmosphere and S represents the force of the spring 106.

The balancing of the forces on the opposite sides of the diaphragm 84 may be represented mathematically by the equation:

$$AD+S=C(D-B)+S'$$

If the beforementioned maximum safe military ratio is to be maintained, the force of the spring 88a and the bellows 88 must be greater than the force of the spring 106. This difference in spring force divided by the effective area of the head 90 of the bellows 88, which is substantially a constant, may be represented as K. Substituting this value for $$\frac{S'-S}{B} \text{ gives } C=\frac{AD-KB}{D-B}$$

The values of diaphragm area and effective bellows end area are of course known constants. The relation between the areas of the outer and inner sides of the diaphragm 84 against which air pressure is effective, may be taken as a ratio which is an important factor in determining the ratios at which cabin pressures will be controlled. The relationship between the two areas may be expressed as $$R'=\frac{D}{D-B}$$

Substituting R' for $$\frac{D}{D-B}$$

in the above stated equation for control chamber pressure gives the following equation:

$$C=AR'-\frac{KB}{D-B}$$

It is apparent from the equation $$C=\frac{AD-KB}{D-B}$$

that $$C-K=\frac{AD-KB-KD+KB}{D-B}=\frac{D(A-K)}{D-B}$$

so $$\frac{C-K}{A-K}=\frac{D}{D-B}=R'$$

So throughout the entire ratio control range the ratio $$\frac{C-K}{A-K}$$

will be equal to the constant value R'.

Therefore, the equation for the ratio between cabin and ambient pressure may be derived by dividing both sides of the above stated equation by A and is as follows:

$$\frac{C}{A}=R'-\frac{KB}{A(D-B)}$$

or $$R=R'-\frac{KB}{A(D-B)}$$

using the term R to designate the ratio $$\frac{C}{A}$$

From the last stated equation, it will be apparent that if the value of K is zero, the equation is reduced to $R=R'$, i. e., the ratio between cabin and ambient pressure is the same as the ratio R' of effective diaphragm areas. It will be also apparent from the equation that as the value of A (ambient atmospheric pressure) decreases with increasing altitude, the value of the fraction $$\frac{KB}{A(D-B)}$$

will increase if K is a finite positive quantity, and the value of R minus this fraction will correspondingly decrease. Consequently, the ratio between cabin and ambient pressures will be caused to decrease with increasing altitudes when K has a positive value. Thus the invention meets the need for a control system which will decrease the ratio with increasing altitude, which need is brought about by the fact that the ratio at which the human body can safely stand explosive decompression decreases with increasing altitudes. By providing for decreasing ratio, it is possible to adjust the ratio to its maximum limit consistent with safety to the occupants of the plane, for all altitudes above the level where the ratio control becomes operative.

When the value of K is 1.85, the ratio R will be at a maximum consistent with safety for all altitudes within the ratio control range. This may be termed as "expansion" ratio, and so the type desired by the military. Also, where K equals 0 the ratio R will be at a maximum consistent with the performance of the superchargers for commercial operation.

The screw 89 provides for adjustment of the control mechanism.

I claim:

1. In mechanism for controlling the pressure in an enclosure: means for controlling the flow of fluid relative to said enclosure, including a movable pressure sensitive element subjected on one side to enclosure pressure; walls defining a control pressure chamber, the other side of said pressure sensitive element being subjected to the pressure in said chamber; means for controlling the pressure in said chamber including a pair of cooperable valve members controlling the flow of fluid relative to said chamber; an absolute pressure responsive device controlling one of said valve members, said absolute pressure responsive device being exposed to enclosure pressure; means connecting said pressure sensitive element and the other valve member; a differential and ratio control mechanism including a movable wall member exposed on one side to atmospheric pressure and on the opposite side to enclosure pressure; a pair of valve members cooperable with each other for controlling the flow of fluid relative to said control chamber, one of said valve members being connected with the movable wall and the other of said valve members being connected with the connecting means; and an absolute pressure responsive device responsive to enclosure pressure and mechanically cooperable with the movable wall only when the pressure in the enclosure drops below a predetermined value.

2. In mechanism for controlling the pressure in an enclosure: means for controlling the flow of fluid relative to said enclosure, including a movable pressure sensitive element subjected on one side to enclosure pressure; wall means defining a control pressure chamber, the other side of said pressure sensitive element being subjected to the pressure in said chamber; means for controlling the pressure in said chamber, including valve means controlling the flow of fluid relative to said chamber; and a differential and ratio control mechanism including a differential pressure responsive wall subjected on one side to enclosure pressure and on the other side to pressure outside said enclosure, and an absolute pressure responsive device subjected to enclosure pressure and mechanically cooperable with said wall only when the pressure in the enclosure drops below a predetermined value, said differential and ratio control means controlling said valve; and means operably connecting the pressure sensitive element and said valve.

3. In mechanism for controlling the pressure in an enclosure: means for controlling the flow of fluid relative to said enclosure, including a movable pressure sensitive element subjected on one side to enclosure pressure; wall means defining a control pressure chamber, the other side of said pressure sensitive element being subjected to the pressure in said chamber; means for controlling the pressure in said chamber, including a pair of cooperable movable valve members controlling the flow of fluid relative to said chamber; differential and ratio control means for controlling one of said valve members and including a movable wall subjected on one side to enclosure pressure and on the opposite side to ambient pressure; absolute pressure responsive means subjected to enclosure pressure and adapted to operably engage the movable wall when enclosure pressure drops below a predetermined value at which time the absolute pressure responsive means urges the one valve member in the opening direction and said enclosure pressure acts on the movable wall to urge said valve member in the opening direction; and a connection between the pressure sensitive element and the other of said valve members for restricting fluid flow from the control chamber when the pressure sensitive element moves in the enclosure pressure urged direction.

4. Mechanism for controlling the pressure in an enclosure: means for controlling the pressure in said enclosure, including an outflow valve and a movable pressure sensitive element controlling said valve, said element being subjected on one side to enclosure pressure urging the element in a direction to effect opening of the valve; wall means defining a control pressure chamber, the other side of said pressure sensitive element being subjected to the pressure in said chamber; means for controlling the pressure in said chamber, including a pair of cooperable movable parts controlling the flow of fluid relative to said chamber; a differential pressure responsive diaphragm operably connected to one of the valve parts and subjected on one side to ambient pressure urging the diaphragm in a direction to effect restriction of the flow of fluid relative to the chamber and subjected on the opposite side to enclosure pressure for urging the diaphragm in a direction to increase the flow of fluid relative to said chamber; an absolute pressure responsive device subjected to enclosure pressure and having a movable part separated from the diaphragm when enclosure pressure is above a predetermined value and engageable with said diaphragm for cooperative control of the one valve part when enclosure pressure drops belows said predetermined value; and means connecting the outflow valve and the other of said valve parts and adapted to effect restriction of the flow of fluid relative to the control chamber when the outflow valve moves in the opening direction.

5. In mechanism for controlling the pressure within an enclosure: means for controlling the flow of fluid relative to said enclosure, including a movable pressure sensitive element; means defining a control pressure chamber, one side of said pressure sensitive element being subjected to the pressure in said chamber; means for controlling the pressure in said chamber, including first valve means for controlling the flow of fluid relative to said chamber, and absolute pressure responsive means controlling said valve means; differential and ratio means for controlling the pressure in said chamber, including second valve means for controlling the flow of fluid relative to said chamber, and pressure responsive means having pressure responsive parts subjected to enclosure pressure and ambient atmospheric pressure controlling the second valve means, one of said parts being a differential pressure responsive element and the other of said parts being an absolute pressure responsive device engageable with said differential pressure responsive element when subjected to a pressure below a predetermined value and disengaged from said pressure responsive element when subjected to a pressure above said predetermined value; and means positively connecting said pressure sensitive element with the first and second valve means for actuating said valve means so as to minimize hunting action of the means for controlling the pressure in said control chamber.

ROBERT A. ARTHUR.

References Cited in the file of this patent

UNITED STATES PATENTS

| Number | Name | Date |
|---|---|---|
| 2,419,707 | Cooper et al. | Apr. 29, 1947 |
| 2,498,633 | Arthur | Feb. 28, 1950 |
| 2,549,672 | Del Mar | Apr. 17, 1951 |
| 2,549,673 | Del Mar | Apr. 17, 1951 |
| 2,610,564 | Cooper et al. | Sept. 16, 1952 |